Dec. 22, 1953 P. GUZY 2,663,110
FISHING SIGNAL
Filed March 3, 1952 2 Sheets-Sheet 1

Pete Guzy
INVENTOR.

Dec. 22, 1953  P. GUZY  2,663,110
FISHING SIGNAL
Filed March 3, 1952  2 Sheets-Sheet 2
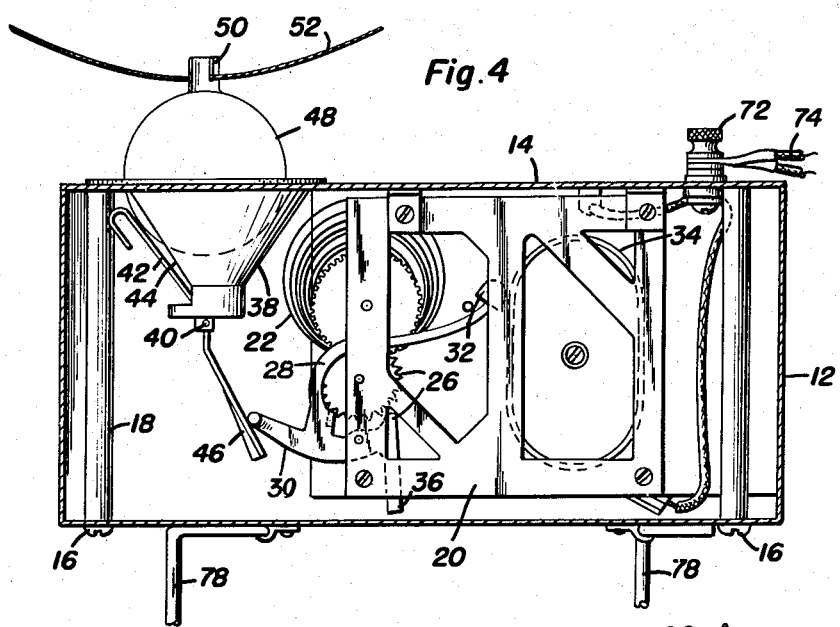
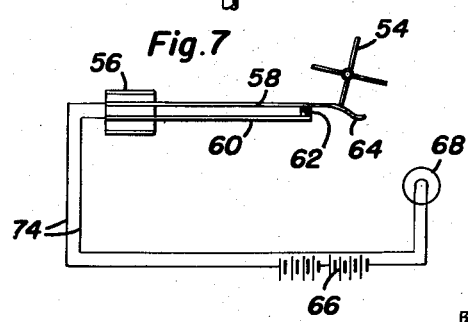
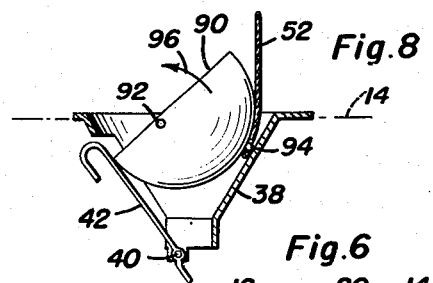
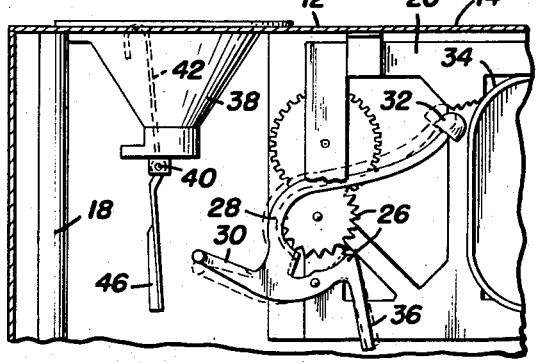
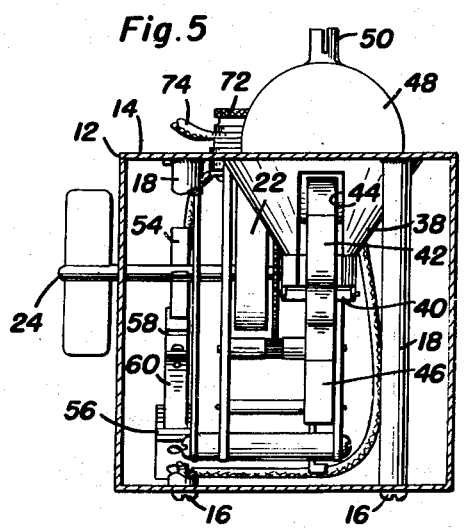
Pete Guzy
INVENTOR.

Patented Dec. 22, 1953

2,663,110

UNITED STATES PATENT OFFICE 2,663,110

FISHING SIGNAL

Pete Guzy, Washington, Pa.

Application March 3, 1952, Serial No. 274,530

2 Claims. (Cl. 43—17)

This invention relates to new and useful improvements and structural refinements in fishing signals, and the principal object of the invention is to provide a device herein described, which may be conveniently and effectively employed for issuing a visible as well as an audible signal when a fish bites on the line.

Primarily the invention is intended for use in night fishing, and one of the important features of the invention resides in the provision of means for dependably actuating the signal, while other advantages of the invention lie in its simplicity of construction, in its dependable operation and in its adaptability for use with fishing equipment of various types.

With the above more important objects and features in view, and such other objects and features as may become apparent as this specification proceeds, the invention consists essentially of the arrangement and construction of parts as illustrated in the accompanying drawings, in which:

Figure 4 is a side elevational view of the signal actuating mechanism with the near wall of the housing removed;

Figure 5 is an end view of the signal actuating mechanism with the near wall of the housing removed;

Figure 6 is a fragmentary elevational view, similar to that shown in Figure 4, but illustrating the mechanism in actuation;

Figure 7 is a diagrammatic view of the electrical components of the invention; and Figure 8 is a sectional view of a modified embodiment of the invention.

Like characters of reference are employed to designate like parts in the specification and throughout the several views.

Figure 1:
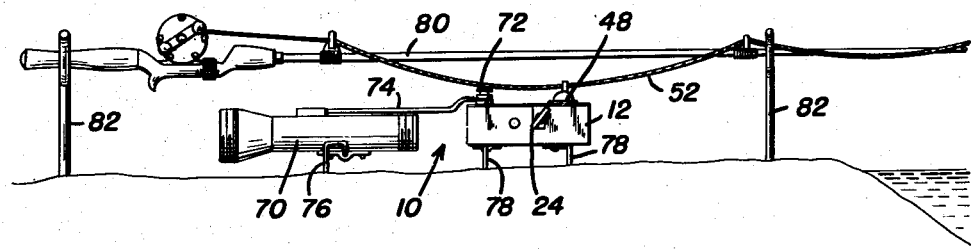
Figure 1 is a side elevational view showing the invention associated with a fishing rod, the invention being in an inactive position.

Referring now to the accompanying drawings in detail, the invention consists of a fishing signal which is designated generally by the reference character 10 and embodies in its construction a rectangular housing 12 which includes a removable cover 14 which is sustained in position by a plurality of screws 16 extending into screw-threaded, tubular sockets 18, affixed to the underside of the cover, the screws 16 passing through the bottom of the housing as shown.

The housing 12 accommodates a clockwork mechanism designated generally by the reference character 20, including the usual spring 22, a winding shaft 24 and an escapement mechanism 26, this escapement mechanism including a lever 28 having an extension 30, the purpose of which will be hereinafter described. The lever 28 is also provided with a hammer 32 for actuating a bell 34, and a weight or ballast 36 is also carried by the lever 28, as shown.

The housing 12 is also provided with a substantially frusto-conical socket 38 which is mounted in the top wall or cover 14 of the housing, the lower portion of the socket having a transverse pivot pin 40 mounted therein on which is disposed a trigger lever 42. The upper end portion of this lever is located in a recess 44 with which the socket 38 is provided at one side, while the lower end portion of the lever carries a weight 46. The socket 38 is adapted to receive therein a spherical control member 48 having a slotted boss 50 for connection to a fishing line 52.

Figure 3:
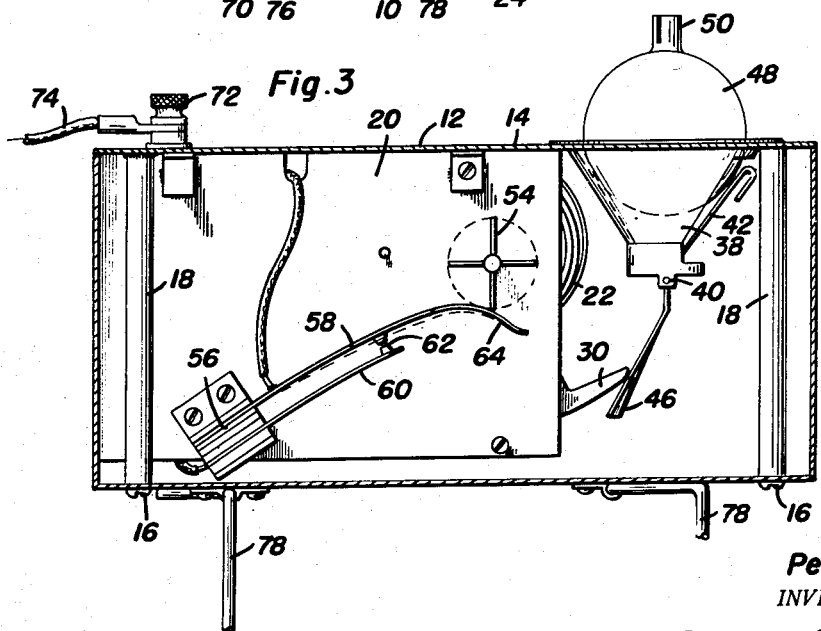
Figure 3 is a vertical sectional view of the signal actuating mechanism.

The clockwork mechanism 20 drives a cross-shaped cam 54 which, in turn, actuates an electric switch 56, including a pair of resilient contact arms 58, 60 having coacting contact points 62. The contact arm 58 is provided with an arcuate extension 64 which is engaged by the cam 54, as is best shown in Figures 3 and 7.

The switch 56 is connected in series with a battery 66 and the bulb 68 of a flashlight 70, the usual switch of the flashlight being short circuited or by-passed so that the switch 56 may function in its place. Suitable terminals 72 are provided on the exterior of the housing 12 so that conductors 74 may be taken from the housing to the flashlight 70, as will be clearly apparent.

Figure 2:
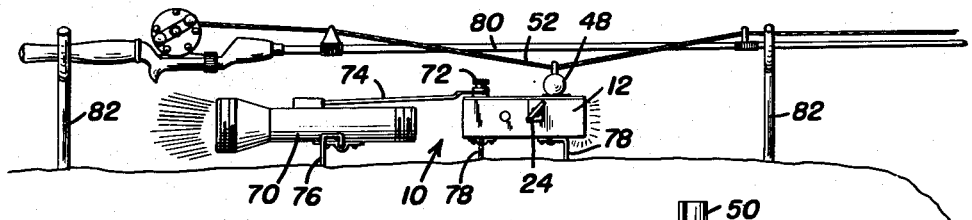
Figure 2 is a side elevational view similar to that shown in Figure 1 but showing the invention energized.

The flashlight 70 is provided with a collapsible leg 76 while similar collapsible legs 78 are provided on the bottom of the housing 12, whereby the flashlight and the housing may be conveniently supported by inserting the legs 76, 78 into the ground, as shown in Figures 1 and 2. The flashlight and the housing are preferably disposed under a conventional fishing rod 80 supported by any suitable means 82.

When the invention is placed in use as shown in Figure 1, the fishing line 52 is engaged with the slotted bar 50 of the control member 48 and the latter is seated in the socket 38 so as to engage the lever 42 and urge it to a position wherein the lower portion 46 of the lever contacts the extension 30 of the escapement mechanism lever 28 and thereby prevents the clockwork mechanism 20 from operating.

However, when a fish tugs upon the line 52, the control member 48 becomes unseated in the socket 38 as shown in Figure 2 and the weight 46 causes the lever 42 to swing to a substantially vertical position wherein it is disengaged from the extension 30 of the escapement lever 28, so that the clockwork mechanism 20 becomes energized and the bell 34 issues a signal to attract the attention of the fisherman.

At the same time, the clockwork mechanism 20, through the medium of the rotating cam 54, alternately opens and closes the switch 56, so that the flashlight 70 issues a visible warning.

A suitable stop mechanism (not shown) may be incorporated in the clockwork mechanism for the purpose of arresting its movement when so desired by the fisherman, such as for example, after the fisherman's attention has been attracted, and it is to be also noted that by simply rotating the winding key or shaft 24, on which the cam 54 is positioned, the cam may be turned to such a position relative to the switch arms 58, 60, that the switch 56 is opened and the energization of the flashlight 70 is discontinued once the signal has been observed.

In the event that the signal is permitted to continue in operation without being noticed until such time as the spring 22 of the clockwork mechanism has run down, the particular arcuate configuration of the arm portion 64 of the switch 56 will cause the cam 54 to come to a stop, when the clockwork mechanism is almost completely run down, in such a position that the contact points 62 of the switch 56 are closed, so that the flashlight 70 will continue to be energized even though the clockwork mechanism is no longer active.

If desired, the flashlight 70 may be built in the housing 12 so that the entire apparatus is in the form of a single unit.

Referring now to a modified form of the invention shown in Figure 8, the aforementioned spherical control member 48 is substituted by a hemi-spherical member 90 which is swingably mounted on an eccentrically disposed pivot pin 92 provided in the socket 38. The relatively larger and heavier side of the member 90 is provided with a projecting pin or detent 94 which engages the socket while the trigger lever 42 is depressed by the member 90. The fishing line 52, rather than being directly attached to the member 90, is simply passed under the detent 94 and when a fish pulls on the line, the member 90 is swung upwardly as shown at 96 to a position wherein its heavier side passes over the pin 92 and rests on the upper edge of the socket 38. In this position the member 90 is disengaged from the lever 42 and the alarm is set off.

It is believed that the advantages and use of the invention will be readily understood from the foregoing disclosure and, accordingly, further description thereof at this point is deemed unnecessary.

While in the foregoing there has been shown and described the preferred embodiment of this invention it is to be understood that minor changes in the details of construction, combination and arrangement of parts may be resorted to without departing from the spirit and scope of the invention as claimed.

Having described the invention, what is claimed as new is:

1. A fishing signal comprising in combination a housing including a cup-shaped socket having a longitudinal slot formed in one side thereof, a clockwork mechanism including an escapement member provided with an elongated arm mounted in said housing, a release lever pivotally mounted intermediate its ends on the lower portion of said socket in such a manner that the upper portion thereof normally projects into said socket through said slot and the lower portion thereof is adapted to engage said arm to block movement thereof when the upper portion of the lever is forced out of the housing and a control member adapted for actuation by a fishing line and seated in said socket in operative engagement with the upper end of said lever and adapted to hold the lower end of said lever in contact with said arm to prevent movement of the same whereby said clockwork mechanism may be energized when said member is unseated, a signalling device, and means responsive to energization of said mechanism for actuating said signalling device.

2. The structure as defined in claim 1, wherein said means includes a cam rotated by said clockwork mechanism, and an electric switch actuated by said cam, said signalling device comprising a lamp in circuit with said switch.

PETE GUZY.

References Cited in the file of this patent

UNITED STATES PATENTS

| Number | Name | Date |
|---|---|---|
| 354,829 | Evans | Dec. 21, 1886 |
| 748,638 | McQuown | Jan. 5, 1904 |
| 952,024 | Wheeler | Mar. 15, 1910 |
| 1,120,712 | Hall | Dec. 15, 1914 |
| 1,639,615 | Sapp | Aug. 16, 1927 |
| 1,847,798 | Wark | Mar. 1, 1932 |
| 2,076,299 | Kloess | Apr. 6, 1937 |
| 2,518,517 | Baulski | Aug. 15, 1950 |
| 2,556,628 | Nisle, Sr. | June 12, 1951 |
| 2,560,905 | Teel | July 17, 1951 |
| 2,599,099 | Folker | June 3, 1952 |